United States Patent [19]

Arai et al.

[11] 4,272,185

[45] Jun. 9, 1981

[54] PHOTOGRAPHIC APPARATUS

[75] Inventors: Toshio Arai, Kawasaki; Takeshi Nagasawa, Yokohama; Toshio Iwaya, Machida; Shunzo Inoue; Motofumi Konishi, both of Yokohama, all of Japan

[73] Assignee: Canon Kabushiki Kaisha, Tokyo, Japan

[21] Appl. No.: 73,424

[22] Filed: Sep. 7, 1979

[30] Foreign Application Priority Data

Sep. 14, 1978 [JP] Japan ................................ 53-113032
Sep. 14, 1978 [JP] Japan ................................ 53-113037

[51] Int. Cl.³ ............................................ G03B 29/00
[52] U.S. Cl. ...................................... 355/28; 226/119; 354/319
[58] Field of Search ........................... 355/16, 27, 28; 354/297, 319; 226/97, 118, 119

[56] References Cited

U.S. PATENT DOCUMENTS

| 3,557,675 | 1/1971 | Koll et al. ........................ 355/27 X |
| 4,136,946 | 1/1979 | Nishimoto ......................... 355/28 |
| 4,158,496 | 6/1979 | Cieplik ............................ 355/27 X |

FOREIGN PATENT DOCUMENTS 11393 10/1972 Japan .

Primary Examiner—Richard A. Wintercorn
Attorney, Agent, or Firm—Fitzpatrick, Cella, Harper & Scinto

[57] ABSTRACT

A photographic apparatus, in which a plurality of image originals are sequentially photographed on a photographic film of a long length, and the thus photographed film is subjected to development. The photographic apparatus is provided with a film storage chamber, where the exposed film is temporarily stored, and the film stored therein is gradually fed by means of film forwarding rollers which operate in accordance with the film quantity staying in the film storage chamber to a film processing device to develop the exposed film.

15 Claims, 9 Drawing Figures

PHOTOGRAPHIC APPARATUS

BACKGROUND OF THE INVENTION

Field of the Invention

This invention relates to a photographic apparatus, in which a plurality of image originals are sequentially photographed on a photographic film of a long length, and the thus exposed film is developed to obtain visible image.

In the photographic apparatus, wherein a multitude of image originals are sequentially photographed on a lengthy photographic film followed by development of this exposed film, the film at the photo-taking position where the image original is photographed on the film is intermittently fed for every image original, or for a plurality of image originals constituting one unit, while the film at the film processing section where it is subjected to development is continuously fed at a constant speed. As the consequence, whenever such continuous film is present at both the photo-taking section and the film processing section, there would arise such a problem that, due to difference in the film feeding conditions in both sections, the film is broken on its way of feeding, or it is stopped at the processing section to make it highly difficult to read the image on the film. With a view to preventing such trouble, there has been contemplated to form a film loop between the photo-taking section and the film processing section, thereby eliminating influence caused by difference in the film feeding condition in both sections by film loop. Even in this case, however, when the film is set in the apparatus, the film should be pulled out prior to the photo-taking operation, by hand from the film feeding part to a predetermined final position through the photo-taking section and subsequently the film processing section, thereby loading the film in the film carrying path in each section. On account of this, the film was disadvantageously wasted for the length which has been pulled out by hand. Moreover, in view of the fact that the film should be set in predetermined paths in the photographic apparatus over a long length therein the film loading work is complicated and troublesome.

SUMMARY OF THE INVENTION

The present invention has been made with a view to solving such inherent problems in the conventional photographic apparatus, and aims at providing an improved photographic apparatus capable of readily producing a photographic film, on which visible images have been formed.

Another object of the present invention is to provide an improved photographic apparatus, in which a multitude of image originals are sequentially photographed on a photographic film, after which the exposed film is processed to obtain in a short period of time the film having thereon visible images of the originals.

Still another object of the present invention is to provide an improved photographic device capable of minimizing waste of the film and of easily performing the photographic operations.

Other object of the present invention is to provide an improved photographic apparatus capable of cutting the lengthy photographic film into an arbitrary length and of developing such arbitrarily cut film independent of the photo-taking operation.

DESCRIPTION OF THE PREFERRED EMBODIMENTS

In the following, the construction and operations of the photographic apparatus according to the present invention will be described in detail in reference to the accompanying drawing.

Figure 1:
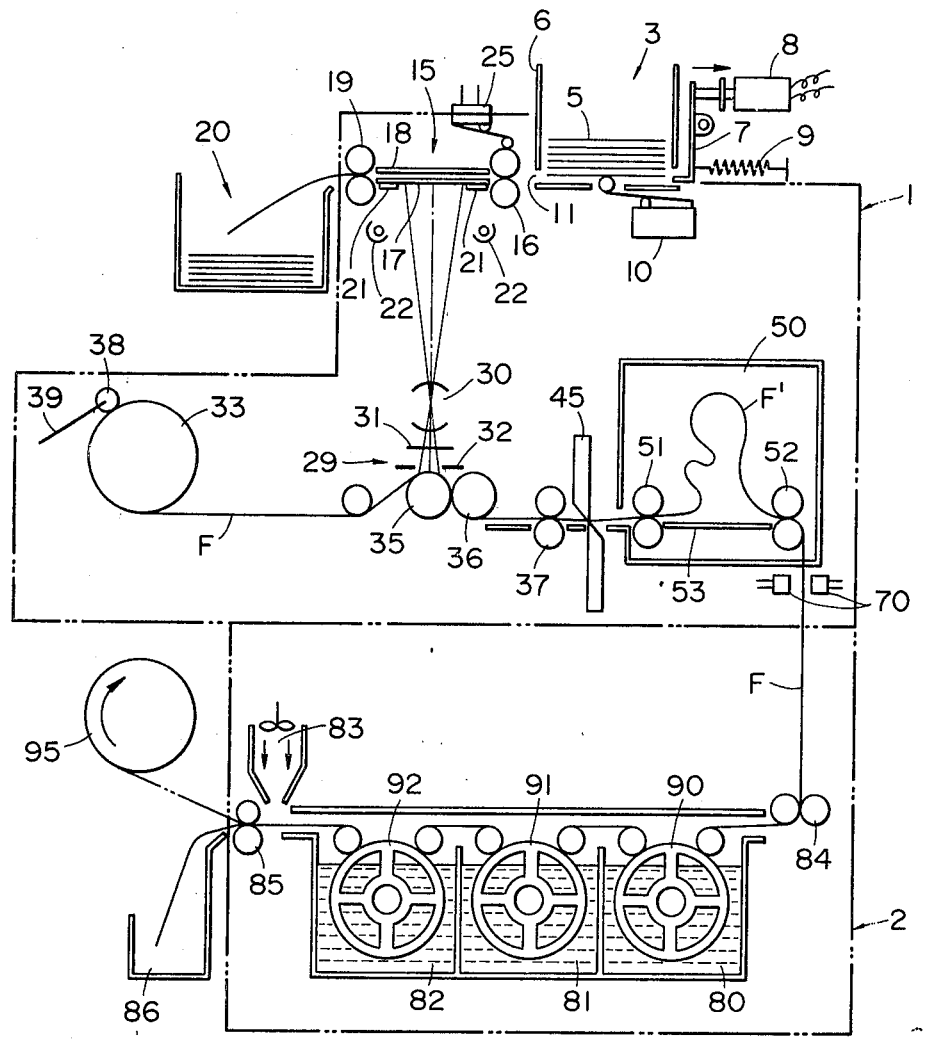
FIG. 1 is a schematic cross-sectional side view showing a general construction of the photographic apparatus according to the present invention.

FIG. 1 shows one embodiment of the photographic apparatus according to the present invention, in which the apparatus is broadly divided into a camera or photo-taking or exposure section 1 where a plurality of image originals are photographed on a photographic film of a long length, and a film processing or processor section 2 where the film exposed at the photo-taking section 1 is subjected to various processing operations such as development, image-fixing, rinsing and drying.

On the top part of the camera section 1, there is disposed an automatic image original feeding device 3, wherein various image originals 5 such as cheques, notes, stock-certificates, business forms, etc. are stacked and loaded in a container 6. A reference numeral 7 designates an oscillatable lever which pushes forward the image originals 5 one by one outside the image original container 6. A numeral 8 refers to an image original forwarding solenoid to drive the lever 7. A numeral 9 indicates a spring connected to one end part of the lever 7. When the solenoid 8 of the automatic image original feeding device 3 is actuated, the lever 7 oscillates against force of the spring 9, whereby the tip end of the lever 7 contacts the edge of the image original at the bottom most of the stack and a single sheet of the image original is pushed forward toward a photo-taking position 15. A reference numeral 10 designates an image original detector to detect presence of the image original in the container 6. The detector consists of a micro-switch which is closed in the presence of the image original in the container to produce an output signal of logic "1".

the image original which has been pushed outside the container 6 is fed to the photo-taking position 15 defined between two sheets of flat glass plates 17, 18 by means of a pair of image original forwarding rollers 16 disposed just in front of the photo-taking position 15. After the photo-taking operation, the image original is further forwarded from the photo-taking position to be discharged into a tray 20 by means of a pair of discharging rollers 19, 19.

Of the abovementioned pair of image original forwarding rollers 16, 16 the upper roller is held movable up and down. When the image original is slipped into the pair of the forwarding rollers 16, 16, the upper roller moves upward due to thickness of the image original, the upward displacement of which is detected by the image original forwarding detector 25. This detector 25 consists of a micro-switch which is closed when the image original is slipped into the pair of the image original forwarding rollers 16, 16 and which continues to produce an output signal of logic "1" until the image original is discharged from the discharging rollers 19, 19. Reference numerals 21, 21 designate slits disposed in the vicinity of the photo-taking position, and 22, 22 lamps for illuminating the image original. The rollers 16, 16 and 19, 19 are connected to a driving source for photo-taking (not shown) and driven, when the image original forwarding detector 25 is turned on, to forward the image original jointly at the same speed. A numeral 30 refers to a projecting lens, 31 a shutter, and 32 a slit. The shutter 31 becomes operative when the image original forwarding detector 25 is turned on and opens the photo-taking light path. The image original 5, when it is passing by the photo-taking position, is projected by the projecting lens 30 onto a micro-film F moving over the exposure position. The micro-film F moves in synchronism with forwarding of the image original, as will be described later. The micro-film F is wound around a film feeding reel 33 and is guided to a pair of conveying rollers 37 passing between a capstan roller 35 and a pinch roller 36. The capstan roller 35 and the film conveying rollers 37 are connected to a driving source (not shown), rotate when the image original forwarding detector 25 is turned on, and forward the film at the same speed as the moving speed of the image original on the surface of the capstant roller 35. A reference numeral 38 designates a roller which contacts the outermost surface of the film wound around the film feeding reel 33, and 39 refers to an oscillatable arm which supports the roller 38 at its one end. These roller 38 and the oscillatable arm 39 are to detect the residual quantity of the film wound around the film feeding reel 33, and are so constructed that a warning signal may be emitted when the film quantity becomes less than a predetermined quantity. A reference numeral 45 designates a cutter for cutting the film, which is driven by a solenoid (not shown). A numeral 50 refers to a film storage chamber for temporarily storing the exposed film therein, at both inlet and outlet of which there are respectively disposed a pair of driving rollers 51 for introducing the film into the chamber and a pair of driving rollers 52 for discharging the same therefrom. The rollers 51 and 52 are provided in the vicinity of the film conveying path near these inlet and outlet. The exposed film is forwarded into the film storage chamber by the driving rollers 51, after which it is sent out of the chamber by the driving rollers 52. By a difference in film forwarding quantity between the driving rollers 51 and 52, a quantity of the film stays in the chamber 50 in the form of a loop.

The driving rollers 51 are associated with the capstan roller 35 and the conveying rollers 37 to be rotated together, and these rollers 35, 37 and 51 forward the film at the same speed. The pair of driving rollers 51 are in such a shape that the diameter at both sides is greater than that at the center part thereof, and the film F is held between the large diameter parts of the driving rollers 51. The driving rollers 52 are in the exactly same shape as the driving rollers 51.

Figure 2:
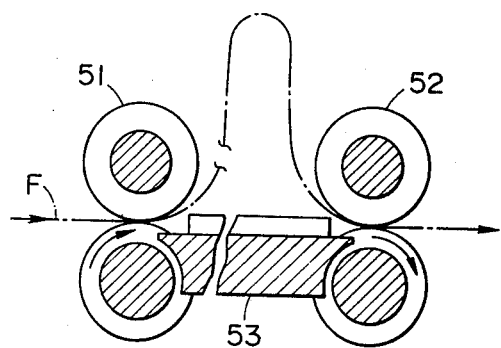
FIG. 2 is a cross-sectional side view showing the main part of a film storage chamber used in the present invention.

A film guiding member 53 is disposed between the driving rollers 51 and 52. It has projected parts 53a, 53a at both ends in the vicinity of the small diameter parts of the rollers 51 and 52, and vertical walls 53b, 53b at both sides thereof to be engaged with both edges of the film to restrict its sidewise movement. This film guiding member 53 functions to guide the tip end of the film so as not to deviate from its predetermined path when the tip end thereof is slipped between the driving rollers 51 and 52, and also to accurately forward the film even when a loop of the film in various sizes as shown in FIG. 2 is formed between the driving rollers 51 and 52.

Figure 3:
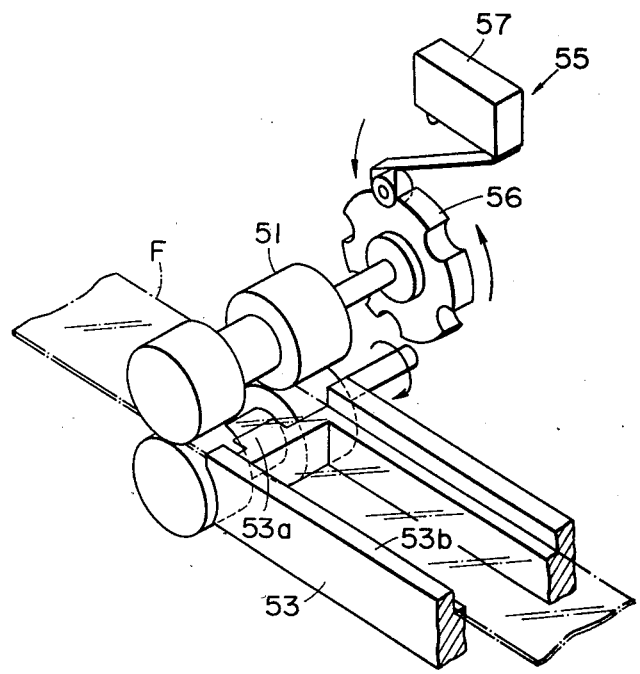
FIG. 3 is a perspective view of driving rollers and a film guiding member according to the present invention.

In FIG. 3, a numeral 55 refers to a first pulse generator which intermittently generates pulses in response to rotation of the driving rollers 51. The first pulse generator 55 is constructed with a cam disc 56 fixedly mounted on a shaft of one of the driving rollers 51, and a microswitch 57 which turns on and off by projections formed around the peripheral surface of the cam disc 56 with a certain definite space intervals. In the same manner, a second pulse generator is connected to the driving rollers 52 to intermittently generate pulses in response to rotation of the driving rollers 52. Incidentally, these pulse generators are not limited to that of the disclosed embodiment alone, but various known types may be used. The first and second pulse generators are so constructed that they may generate one pulse when the driving rollers 51 and 52 respectively forward the same amount of the film.

Figure 4:
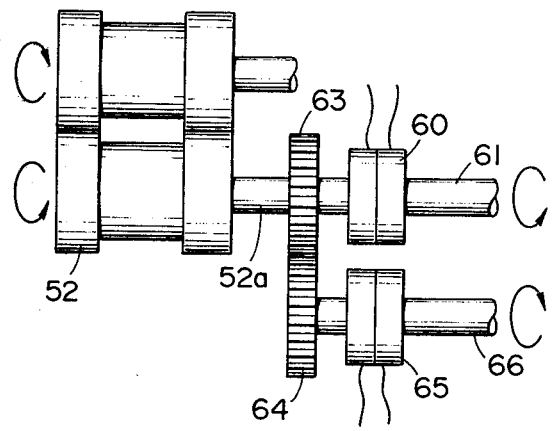
FIG. 4 is a front view showing a drive mechanism for the driving rollers 52.

FIG. 4 illustrates a driving mechanism for the driving rollers 52, in which a shaft 52a of one of the driving rollers is connected with a first driving shaft 61 through a first electromagnetic clutch 60. This first driving shaft 61 is coupled with the capstan roller 35, the conveying roller 37, and the driving rollers 51 to be rotated together, and is driven by the driving source at the exposure section 1. A gear 63 is also fixedly mounted on the shaft 52a, and is meshed with a gear 64 fixedly mounted on another shaft disposed in parallel with the shaft 52a. The shaft of the gear 64 is coupled with a second driving shaft 66 through a second electromagnetic clutch 65. This second driving shaft 66 is associated with the driving source at the film processing section 2. When the first electromagnetic clutch 60 is actuated, the shaft 52a and the first driving shaft 61 are drivingly coupled, whereby the driving rollers 52 forward the film at the same speed as the rollers 35, 37 and 51. On the other hand, when the second electromagnetic clutch 65 is actuated, the shaft 52a and the second driving shaft 66 are drivingly coupled, whereby the driving rollers 52 forward the film at the same speed as at the film processing section 2. In case of both first and second electromagnetic clutches 60 and 65 being off, the driving rollers 52 do not rotate. Incidentally, the film forwarding speed by the rollers 36 and 37 at the camera section 1 is set to be higher than the film forwarding speed at the film processing section 2 with the consequence that the photographic operation is performed at a high speed.

Reverting to FIG. 1, a reference numeral 70 designates a film detector comprising an infrared ray lamp and an infrared ray detecting light receiving element. The film detector is turned on when it detects presence of the film and produces an output signal of logic "1". For the micro-film, a silver salt film, for example, is used in this embodiment. The silver salt film is not sensitive to the infrared ray. A numeral 80 refers to a developing device, 81 and 82 designate rinsing devices, and 83 indicates a drying device. The film F which has been sent from the camera section 1 into the film processing section 2 is forwarded by conveyor rollers 84, 84, developed with developing liquid in the developer 80, rinsed with water in the rinsing devices 81 and 82, dried with hot blast air from the drying device 83, and finally discharged into a tray 86 through discharging rollers 85, 85. In each liquid vessel of the developer 80 and the rinsing devices 81 and 82, there is disposed a driving drums 90, 91 and 92, respectively. The film F is automatically guided and forwarded along each of these drums. The automatic film guiding device to guide the film along the film conveying path after it is discharged from the film storage chamber has already been well known, hence it is omitted from illustration in this application. For the developing liquid in the developer 80, a single-bath-development-and-image-fixing liquid is used. It is, of course, possible that the development and the image fixing may be done in separate vessels. The film conveying rollers 84, the film discharging rollers 85, and the driving drums 90, 91 and 92 are mutually associated and rotated together. These rollers and drums are driven by a driving source (not shown) to forward the film at the same speed. A reference numeral 95 designates a take-up reel to be used when the film is wound thereon.

Figure 6:
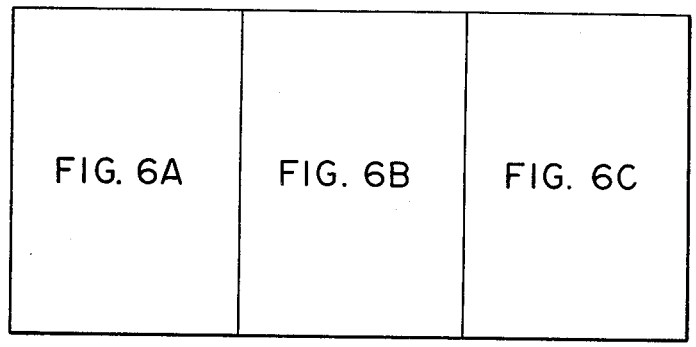
FIG. 6 is a combination chart for FIGS. 6A, 6B and 6C showing a control circuit for the photographic apparatus according to the present invention.
Figure 6A:
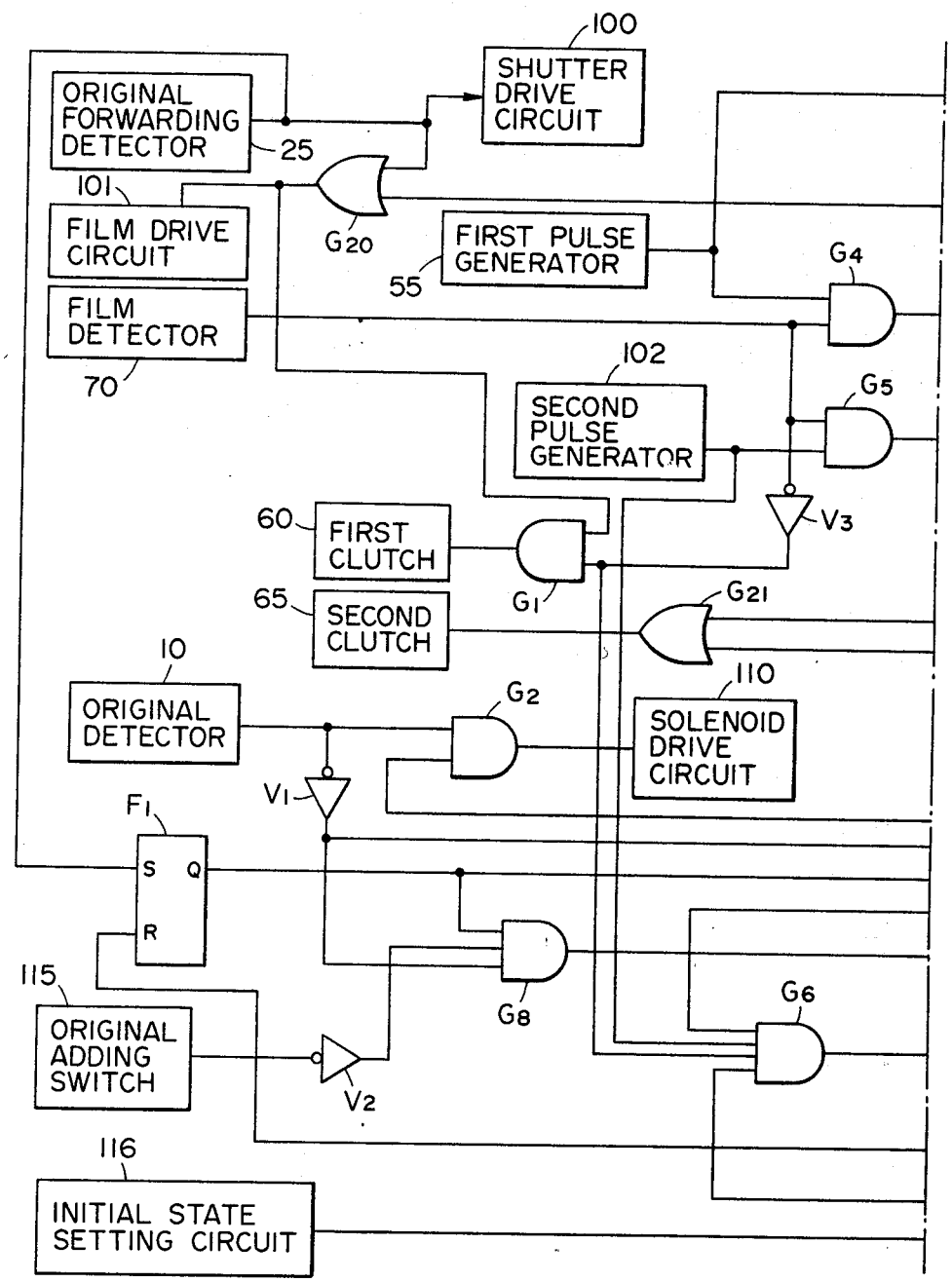
Figure 6B:
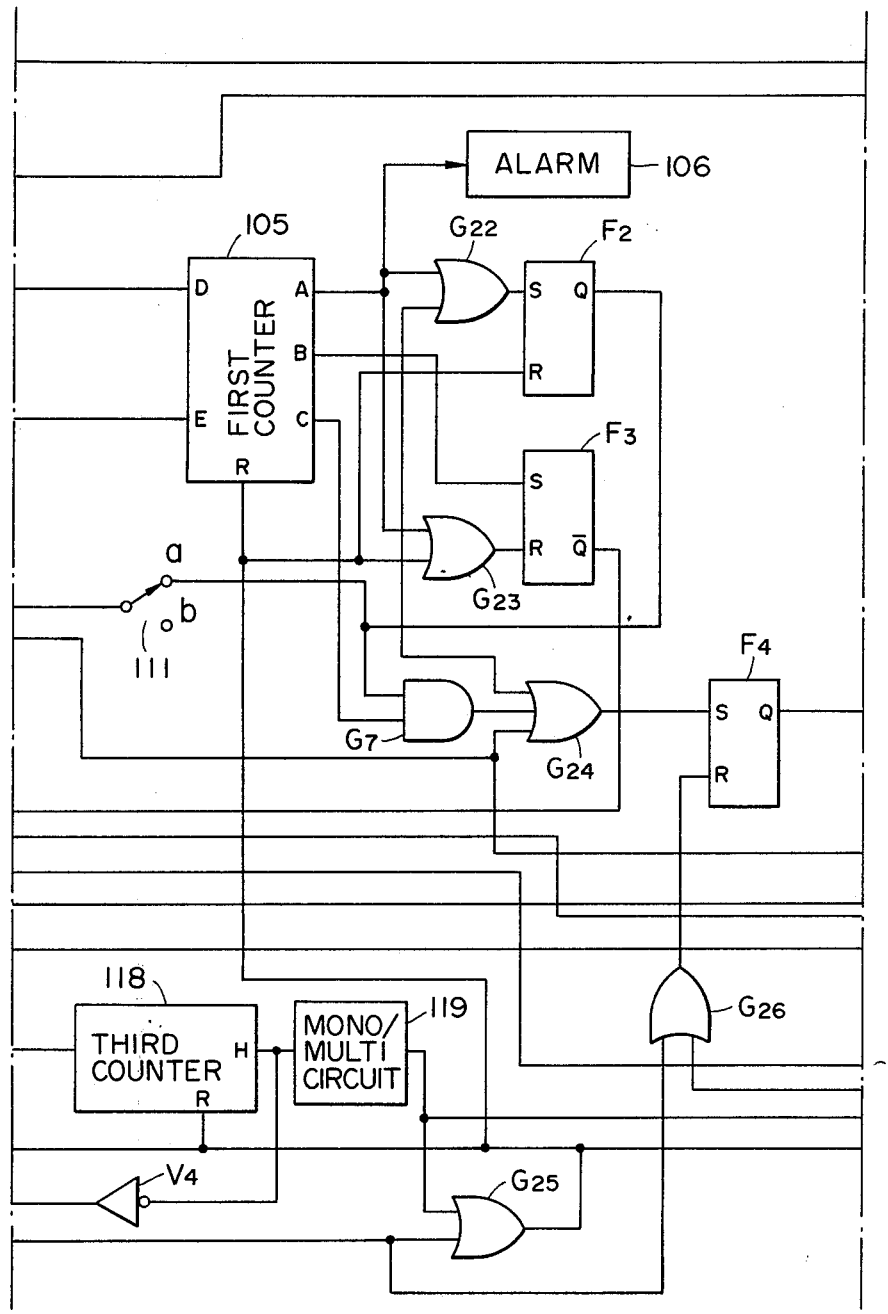
Figure 6C:
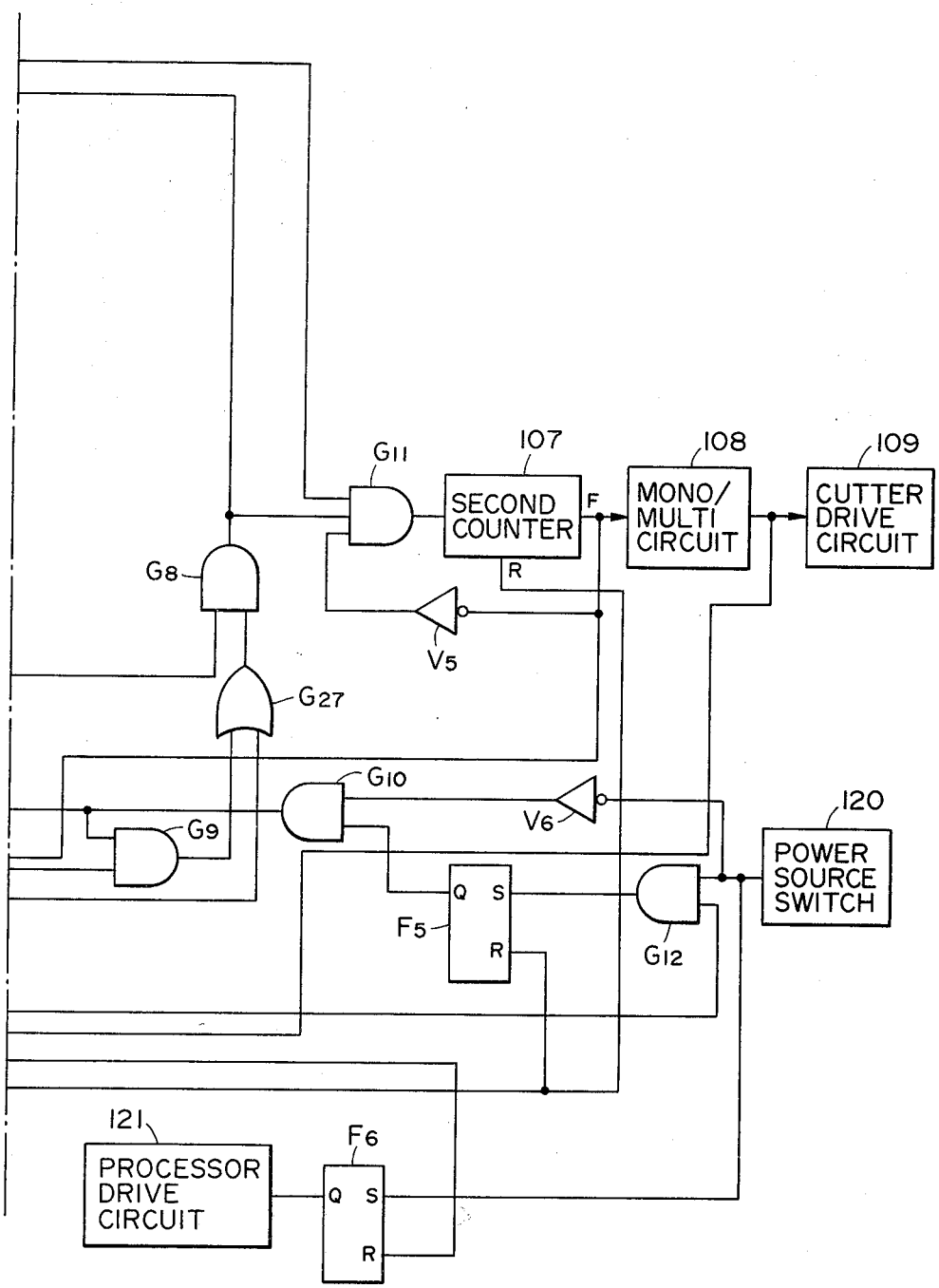

FIG. 6 illustrates a control circuit for the photographic device according to the present invention. In the drawing, a numeral 100 refers to a shutter driving circuit which operates to open the shutter 31 when it receives the logic "1" signal from the original forwarding detector 25. A numeral 101 refers to a film driving circuit which actuates a driving source to rotate the capstan roller 35, the film conveying roller 37, and the driving rollers 51 when it receives a drive input signal. A reference numeral 102 designates the above mentioned second pulse generator which generates pulses in response to rotation of the driving rollers 52. A reference numeral 105 designates a first counter which operates to add or subtract the pulses from the first and second pulse generators 55 and 102. It operates to add input signals into its input terminal D, subtract input signals into its input terminal E, produce output signals from its output terminal A when the counted value reaches a first set value, produce output signals from its output terminal B when the counted value reaches a second set value which is greater than the first set value, produce output signals from its output terminal C when the counted value reaches a third set value which is extremely smaller than the first set value, and to be reset when a reset signal enters its input terminal R. A numeral 106 refers to an alarm device such as a buzzar, etc., and a numeral 107 refers to a second counter which counts pulses from the first pulse generator 55. It produces an output signal from its output terminal F when the counted value reaches a predetermined value, and is reset when a reset signal enters its input terminal R. A reference numeral 108 refers to a mono/multi circuit, and 109 designates a cutter driving circuit which operates to drive the cutter 45 and cut the film when it receives a driving signal input. A reference numeral 110 designates a solenoid driving circuit which operates to drive the solenoid 8 when it receives a drive input signal, and to push forward the image original 5 outside the container 6. A numeral 111 refers to a changeover switch which can be changed over manually from a contact a to a contact b. A reference numeral 115 designates an image original adding switch which determines whether image originals are to be added, or not. In case of adding the image original when the image originals have been exhausted from the container 6, the switch is changed over manually to select replenishment of the image originals into the container 6, by the changeover of which a signal of logic "1" is generated. A numeral 116 refers to an initial state setting circuit which is operated to produce a reset signal output of logic "1" when the power source switch for the device is closed. A reference numeral 118 indicates a third counter to count the pulses from the second pulse generator 102. The third counter produces an output signal from its output terminal H when its counted values reaches a predetermined value, and is reset when a reset signal enters its input terminal R. A reference numeral 119 designates a mono/multi circuit, 120 a power source switch, and 121 a processor driving circuit which actuates a driving source (motor) to rotate the rollers 84, drums 90, 91 and 92, and film discharging rollers 85 when a drive signal input enters therein, $G_1$, $G_2$, ... $G_{12}$ refer to "AND" gates; $G_{20}$, $G_{21}$, ... $G_{27}$ refer to "OR" gates; $V_1$, $V_2$, ... $V_6$ refer to inverters; and $F_1$, $F_2$, ... $F_6$ designate flip-flops. Symbols S, R, Q and $\overline{Q}$ in these flip-flops respectively designate set input terminal, reset input terminal, set output terminal, and reset output terminal.

In the following, operations of the photographic apparatus of the above-described construction will be explained.

Prior to the photographic operation, a lid (not shown) of the camera section is opened to pull out the micro-film F wound around the film feeding reel 33. Then, the tip end of the film is manually slipped between the capstan roller 35 and the pinch roller 36, and further between the pair of the film conveying rollers 37. Incidentally, it is understood that the change-over switch 111 is in contact with the contact a, and that the image original adding switch 115 has been changed over to replenish additional image originals. Subsequently, when the power source switch 120 is turned on, the electric power is supplied throughout the photographic device to cause the lamp 22 to light up and the developing liquid to be heated. Also, by this turning-on of the power source switch 120, the flip-flop $F_6$ is set, a set output of which is sent into the processor driving circuit 121 as a driving signal therefor, whereby the driving source of the film processing section 2 is actuated to rotate the rollers 84, the drums 90, 91 and 92, and the discharge rollers 85. Also, a reset signal is generated from the initial state setting circuit 116, with which the counters 105, 107, 118 and the flip-flops $F_1$, $F_2$, $F_3$, $F_4$, $F_5$ are set. When a stack of the image originals 5 is loaded in the container 6 of the automatic image original feeding device after the developing liquid has reached a predetermined temperature which enables the film to be developed, the image original detector 10 is turned on, the "AND" gate $G_2$ is opened, and the solenoid 8 is actuated through the solenoid driving circuit 110, whereby a sheet of the image originals 5 is sent outside the container 6. When the image original forwarding detector 25 detects this image original, the image original forwarding rollers 16 and 19 rotate to bring the image original to its photographic position 15. On the other hand, when this detector 25 detects the image original, the shutter 31 is opened through the shutter driving circuit 100, the "OR" gate $G_{20}$ is opened simultaneously, and the film driving circuit 101 operates to rotate the capstan roller 35, the film conveying roller 37, and the driving rollers 51 together, whereby the film F is forwarded through the exposure position. Accordingly, the image original 5 and the film F are forwarded synchronously, and the image of the original is exposed on the film. In the meantime, the flip-flop $F_1$ is set by turning-on of the image original forwarding detector 25. At this time, since no film is present at the film detection position of the film detector 70, the "AND" gate $G_1$ is opened, the first electromagnetic clutch 60 is turned on, and the driving rollers 52 rotate. The image original 5 is sequentially fed to the photo-taking position by means of the automatic image original feeding device 3, and photographed at that position in the order of their arrangement. With progress in the photographic operation, the tip end of the film forwarded by the film forwarding rollers 37 passes through the cutting position of the cutter 45, sent into the film storage chamber 50 by the driving rollers 51, and, after travelling along the film guiding member 53, is discharged outside the film storage chamber by means of the driving rollers 52. As soon as the top end of the film reaches the detecting position of the film detector 70, the film detector is turned on, the "AND" gate $G_2$ is closed to turn off the first electromagnetic clutch 60, and the driving rollers 52 stop their rotation. On the other hand, by the turning-on of the film detector 70, the "AND" $G_4$ is opened every time a pulse is generated from the first pulse generator 55 in response to rotation of the driving rollers 51, and the pulse is subjected to the addition operation in the first counter 105. Continuously, with progress in the photographic operation, the film is fed into the film storage chamber 50. However, since the driving rollers 52 are in stoppage, the film stores in the film storage chamber in the form of a loop, according to which the counted value of the first counter 105 increases.

Figure 5:
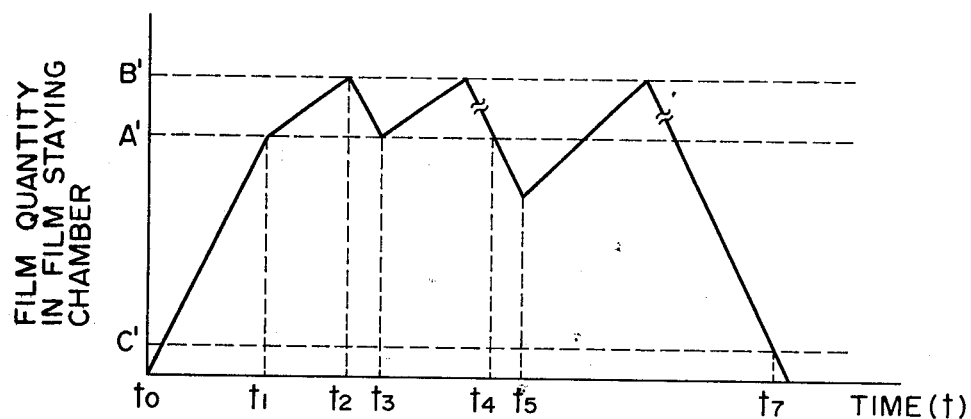
FIG. 5 is a graphical representation showing variations in the film quantity in the film storage chamber.

FIG. 5 shows variations in the quantity of the film stored in the film storage chamber with lapse of time, in which a time $t_0$ indicates a time instant when the tip end of the film has been detected by the film detector 70 from which time onward the film quantity increases with progress in the photographic operation. At a time instant $t_1$, when the film quantity in the storage chamber reaches the first set quantity A', an output signal is produced from the output terminal A of the first counter 105, whereby the alarm 106 is actuated and the flip-flop $F_2$ is set at the same time. By the warning sound from the alarm 106 such as buzzar, an operator is notified of increase in the film quantity in the film storage chamber. By setting of the flip-flop $F_2$, the second electromagnetic clutch 65 is actuated through the "OR" gate $G_{21}$, and the driving rollers 52 rotate in connection with the driving source for the film processing section 2. In response to the rotation of this driving rollers 52, a pulse is generated from the second pulse generator 102. Since the film detector 70 is on, this pulse is forwarded to the first counter 105 through the "AND" gate $G_5$, and subtracted in this first counter. The film discharged from the film storage chamber is sent to the film processing section 2 where it is subjected to development, image fixing, rinsing, and drying, after which it is discharged into the tray 86. When the photo-taking operation is continuously performed, the film quantity in the film storage chamber reaches the second set quantity B' which is greater than the first set quantity A' (a film quantity larger than this second set quantity would cause various problems such as breakage of the film, and others) at the time instant $t_2$, because the film discharging quantity from the film storage chamber is smaller than the film feeding quantity thereinto, whereby a signal is generated from the output terminal B of the first counter 105, and the flip-flop $F_3$ is set by this signal. By this setting of the flip-flop $F_3$, the "AND" gate $G_2$ is closed, and the solenoid 8 is turned off through the solenoid driving circuit 110, whereby feeding of the image original is stopped and the photo-taking operation is no longer performed. By the stoppage of the photo-taking operation, the film quantity in the film storage chamber gradually reduces thereafter. At a time instant $t_3$, when the film quantity resumes the set quantity A, an output signal is again produced from the output terminal A of the first counter 105. By this output signal, the flip-flop $F_3$ is reset, the "AND" gate $G_2$ is opened, and feeding of the image original is restarted, whereby the photo-taking operation is resumed. Thereafter, the operations corresponding to the film quantities at the time instants $t_1$ to $t_3$ are repeated.

When the image originals in the container 6 are exhausted at a time instant $t_4$, i.e., the image original detector 10 is turned off, the rollers 36, 37 and 51 stop their rotation. However, as the driving rollers 52 are continuously rotating, the film quantity in the film storage chamber gradually decreases thenceforward. When the image originals are replenished in the container 6 at a time instant $t_5$, the photo-taking operation is performed again, whereby the film quantity in the film storage chamber increases again. Thereafter the same operations as mentioned above are repeated. Care should be taken in this case that the additional image originals should be loaded into the container 6 before the film quantity in the film storage chamber becomes less than the third set value C'. After this, or during the photo-taking operation, when no image originals are added, the image original adding switch 115 is changed over to a state where no image original is replenished. After change-over of the switch 115, when the image original in the container 6 is exhausted and the image original detector 10 is turned off, and the film quantity in the film storage chamber takes a third set quantity C' which is extremely smaller than the first set quantity A', (a film quantity smaller than this third set quantity C' would cause various problems such that the film is stretched between the rollers 51 and 52 to be broken, and others), a signal is generated from the output C of the first counter, with which the "AND" gate $G_7$ is opened, and the flip-flip $F_4$ is set through the "OR" gate $G_{24}$. On the other hand, since an output signal from the image original adding switch 115 is in the logic "0", and the flip-flop $F_1$ is set by the initial forwarding of the image original, the "AND" gate $G_3$ is opened by the turning-off of the image original detector 10. Accordingly, by the opening of the "AND" gate $G_3$, the film driving circuit 101 is operated through the "AND" gate $G_8$ and the "OR" gate $G_{20}$, and the capstan roller 35 and the film forwarding rollers 37, 51 rotate together to idle-forward the film F (the forwarding of the film through the exposure position without photo-taking operation is termed "idle-forwarding"). Also, by the opening of the "AND" gate $G_8$, the "AND" gate $G_{11}$ is opened every time an input pulse from the first pulse generator 55 is introduced into this "AND" gate $G_{11}$ and this pulse is counted in the second counter 107. When the film is idle-forwarded and the last exposure region of the film passes through the cutting position of the cutter 45, an output signal is generated from the output terminal F of the second counter 107, the mono/multi circuit 108 is actuated, and the cutter 45 is driven by the output signal from the mono/multi circuit 108 through the cutter driving circuit 109, whereby the film is cut. Accordingly, the exposed film portions are separated from the un-exposed film of a long length. On the other hand, the "OR" gate $G_{26}$ is opened by an output signal from the mono/multi circuit 108, and the flip-flop $F_4$ is reset. In this consequence, the "AND" gate $G_8$ is closed, the capstan roller 35, the film conveying rollers 37, the driving rollers 51 stop their rotation, and the idle-forwarding of the film is stopped thereby. When the film as cut by the cutter is forwarded to the film processing section 2 by the driving rollers 52, and the rear end of this cut film, i.e., the cut portion of the film piece passes through the detecting position of the film detector 70, the film detector 70 is turned off. By the turning-off of the detector 70, the "AND" gate $G_6$ is opened every time a pulse from the second pulse generator 102 is introduced as an input into this "AND" gate $G_6$, and this pulse is counted in the third counter 118. Thereafter, the cut film piece is forwarded by the rollers 84, 85 and the drums 90, 91 and 92 in the film processing section. When the rear end part of this film piece passes through the discharing rollers 85, a signal is generated from the output terminal H of the third counter 118, and the mono/multi circuit 119 is actuated. By the output signal from the mono/multi circuit 119, the "OR" gate $G_{25}$ is opened, the counters and the flip-flops are each reset, and a state prior to commencement of the photo-taking operation is set. Thereafter, when new image originals are loaded in the container 6, the photo-taking operation is performed automatically as mentioned in the foregoing. When the image originals are exhausted, the film is automatically cut and one unit of the developed film piece can be obtained automatically.

In the following, explanations will be made as to a case, wherein the photo-taking operation is carried out by changing over the switch 111 to be connected to the contact b prior to commencement of the photo-taking operation.

After start of the photo-taking operation, quantity of the film stored in the film storage chamber 50 increases with progress in the photo-taking operation. When the film quantity reaches the set quantity A', a signal is generated from the output terminal A of the first counter 105, and the alarm 106 is actuated. At this time, however, the second electromagnetic clutch 65 is not actuated and the driving rollers 52 remain in stoppage. Thereafter, when the photo-taking operation is continued, and the film quantity in the film storage chamber 50 reaches the second set value B', the feeding of the image original is stopped by a signal from the output terminal B of the first counter 105, whereby the photo-taking operation is prohibited. Accordingly, the film quantity in the chamber 50 neither increases nor decreases, and it maintains a constant quantity. Therefore, when the photo-taking operation is carried out after the change-over switch 111 is changed over to the contact b, it becomes possible to load the image originals into the container 6 at an arbitary time interval during a period from start of the photo-taking operation to arrival of the film quantity in the film storage chamber at the second set quantity B'. In other words, the interrupted time of the photo-taking operation can be arbitrarily taken longer than in the case where the change-over switch 111 is changed over to be connected to the contact a (i.e., infinitude), whereby the interruption time required for replenishing the image original can be taken longer. Thereafter, when the change-over switch 111 is changed over to be connected to the contact a, the second electromagnetic clutch 65 is turned on through the "OR" gate $G_{21}$, and the driving rollers 52 rotate, whereby the photographic operation can be resumed when the film quantity in the film storage chamber becomes smaller than the set quantity B'. The operations after resumption of the photo-taking operation are the same as mentioned in the foregoing, hence the explanations therefor is omitted. Therefore, at the initial stage of the commencement of the photo-taking operation, when it is necessary to interrupt the photo-taking operation for a long period of time for collecting and arranging the image originals, the change-over switch 111 may be manipulated in advance to such change-over situation.

In the following, explanations will be given as to a case wherein the power source switch is turned off after completion of the photo-taking operation.

Immediately after termination of the photo-taking operation, when the power source switch 120 is turned off, the "AND" gate $G_{10}$ is opened, and the flip-flop $F_4$ is set through the "OR" gate $G_{24}$ irrespective of the film quantity in the film storage chamber. Even when the power source switch 120 is turned off, the photo-taking operation is continued. Thereafter, when the image originals 5 in the container 6 are exhausted and the image original detector 10 is turned off, the "AND" gate $G_9$ is opened and the "AND" gate $G_8$ is opened through the "OR" gate $G_{27}$. In this consequence, the film is idle-forwarded in a predetermined quantity by the opening of the "AND" gate $G_8$, same as mentioned in the foregoing, after which the film is cut. Subsequently, after a predetermined quantity of the film is forwarded in the film processing section 2 until the rear end part of the film piece reaches the film discharging rollers 85, the entire circuits are reset and the feeding of the power to the whole device is stopped. However, in case the power source switch is turned off without performing the photo-taking operation even once, the flip-flop $F_5$ is not set, hence the idle-forwarding and cutting of the film are not performed, and the power supply is immediately shut, whereby waste of the film is prevented.

As described in the foregoing, since the film is forwarded to the film processing section after a certain arbitrary quantity of the film is temporarily stored in the film storage chamber, there is no necessity for the film to be forwarded in advance into the film processing section prior to commencement of the photo-taking operation, whereby waste in the film can be prevented. Also, since there is no necessity for the advance loading of the film in the film processing device, the processing operation can be done easily.

What is claimed is:

1. A recording apparatus comprising:
   means for recording images on a long film located at an exposure station;
   a film storage means for storing the exposed film, in the form of a loop, conveyed from the exposure station;
   first feed means for feeding the film exposed by said recording means to said film storage means;
   developing means for developing the exposed film;
   second feed means for feeding the film stored in said film storage means to said developing means;
   a manual switch;
   a cutter for cutting the film;
   first control means for operating said first feed means in association with operation of said recording means;

second control means, associated with said manual switch, for operating said first feed means to feed the film through a predetermined length;
a detector, downstream of said second feed means with respect to movement of the film, for detecting the presence of the film;
means for operating said second feed means in conjunction with the operation of said recording means until said film detector detects the film;
means for operating said cutter to separate the exposed portion of the film from the unexposed portion, when said first feed means feeds the film through a predetermined length; and
third control means for operating said second feed means to continuously feed the film independently of the operation of said recording means after operation of said manual switch.

2. An apparatus according to claim 1, wherein said manual switch functions also as a power switch.

3. An apparatus according to claim 1, wherein said second control means is operated in conjunction with operation of said first feed means, and includes pulse generating means for generating a pulse every time a predetermined length of the film is fed by said first feed means, counting means for counting the pulses generated by said pulse generator and means for generating a signal for stopping said first feed means when said counting means counts a predetermined number of the pulses, and generating a signal for operating said film cutter.

4. An apparatus according to claim 1, further comprising fourth control means for controlling said second feed means, said fourth control means including a second manual switch having first and second positions, and means for operating, when said switch is operated from the first position to the second position, said second control means in accordance with the length of the film stored in said film storage means.

5. An apparatus according to claim 1, further comprising means for memorizing the operation of said recording means having been carried out, and wherein operations of said second and third control means are inhibited when said memorizing means has no memory of the operation of said recording means having been carried out.

6. A recording apparatus comprising:
means for recording images on a long film located at an exposure station;
a film storage means for storing the exposed film, in the form of a loop, conveyed from the exposure station;
first feed roller means, located adjacent an inlet of said film storage means, for feeding the film exposed by said recording means to said film storage means;
developing means for developing the exposed film;
second feed roller means, located adjacent an outlet of said film storage means, for feeding the film stored in said storage to said developing means;
a manual switch;
a cutter, disposed between said exposure position and said film storage means, for cutting the film;
first control means, associated with said manual switch, for operating said first feed roller means to feed the film through a predetermined length;
means for operating said cutter to separate the exposed portion of the film from the unexposed portion, when said first feed roller means feeds the film through a predetermined length;
means for operating said second feed roller means in conjunction with the operation of said recording means to feed the film at the same speed as said first feed roller means; and
second control means for operating said second feed roller means to continuously feed out of said film storage means the film stored therein independently of the operation of said recording means after operation of said manual switch.

7. A recording apparatus for forming a latent image on a film and developing the same, comprising:
a camera for imagewisely exposing a roll of film;
a processor for processing the film thus exposed;
a film storage means, disposed between said camera and said processor, for storing the film, in the form of a loop, conveyed from said camera;
first feed means for feeding the film to said film storage means;
second feed means for feeding the film stored in said film storage means to said processor;
a detector, downstream of said second feed means with respect to movement of the film;
means for operating said first feed means in conjunction with operation of said camera; and
means for operating said second feed means in conjunction with the operation of said camera, and stopping said second feed means when said film detector detects the film.

8. An apparatus according to claim 7, further comprising a manual switch for instructing the start of film feed by said second feed means, and means for operating said second feed means in conjunction with operation of said manual switch.

9. A recording apparatus comprising:
means for recording images on a long film located at an exposure station;
a film storage means for storing the exposed film in the form of a loop, conveyed from the exposure station;
first feed means for feeding the film exposed by said recording means to said film storage means;
developing means for developing the exposed film;
second feed means for feeding the film stored in said film storage means to said developing means;
measuring means for measuring an amount of the film stored in said film storage means; and
means for actuating said second feeding means to continously feed the film stored in said film storage means to said developing means when the amount measured by said measuring means reaches a first predetermined value.

10. An apparatus according to claim 9, further comprising means for stopping said recording means to prevent the formation of the image on the film, when the amount measured by said measuring means reaches a second predetermined value which is higher than said first value.

11. An apparatus according to claim 9, further comprising first pulse generating means for generating a pulse each time said first feed means feeds a predetermined length of the film, a second pulse generating means for generating a pulse each time said second feed means feeds a predetermined length of the film, and means for counting up the pulses of said first pulse generating means and the pulses of said second pulse generating means.

12. An apparatus according to claim 9, further comprising means for actuating said first feed means to continuously feed a predetermined length of the film to said film storage means, when the amount measured by said measuring means reaches, after it reaches said first predetermined value, a third predetermined value which is smaller than said first value.

13. An apparatus according to claim 9, further comprising a manual switch and means for actuating said second feed means to continuously feed, after operation of said manual switch, the film stored in said film storage means to said developing means, independently of the amount measured by said measuring means.

14. An apparatus according to claim 12, further comprising film cutting means and means for actuating said film cutting means when said first feed means continuously feeds a predetermined length of the film.

15. A recording apparatus comprising:
   means for recording images on a long film located at an exposure station;
   a film storage means for storing the exposed film in the form of a loop, conveyed from the exposure station;
   first feed means for feeding the film exposed by said recording means to said film storage means;
   developing means for developing the exposed film;
   second feed means for feeding the film stored in said film storage means to said developing means;
   measuring means for measuring an amount of the film stored in said film storage means;
   film detecting means, disposed between said film storage means and said developing means, for detecting the film;
   means for operating said second feed means in interrelation with operation of said recording means until said film detecting means detects the film; and
   means for actuating said second feed means to continuously feed the film stored in said film storage means to said developing means when the amount measured by said measuring means reaches a predetermined value.

* * * * *

UNITED STATES PATENT AND TRADEMARK OFFICE
CERTIFICATE OF CORRECTION

PATENT NO. : 4,272,185
DATED : June 9, 1981
INVENTOR(S) : TOSHIO ARAI, ET AL.

It is certified that error appears in the above-identified patent and that said Letters Patent are hereby corrected as shown below:

Column 2, line 57, "the" should read --The--;

Column 3, line 65, "The exactly" should read --exactly the--;

Column 12, line 12, "mage" should read --image--.

Signed and Sealed this

Twenty-seventh Day of October 1981

[SEAL]

Attest:

GERALD J. MOSSINGHOFF

Attesting Officer

Commissioner of Patents and Trademarks